United States Patent [19]

Lu

[11] E Patent Number: Re. 32,883

[45] Reissued Date of Patent: Mar. 7, 1989

[54] QUARTERNARY AMMONIUM SULFATE OR SULFONATE CHARGE CONTROL AGENTS FOR ELECTROPHOTOGRAPHIC DEVELOPERS COMPATIBLE WITH VITON FUSER

[75] Inventor: Chin H. Lu, Webster, N.Y.

[73] Assignee: Xerox Corporation, Stamford, Conn.

[21] Appl. No.: 556,515

[22] Filed: Nov. 30, 1983

Related U.S. Patent Documents

Reissue of:

[64] Patent No.: 4,338,390
Issued: Jul. 6, 1982
Appl. No.: 212,969
Filed: Dec. 4, 1980

[51] Int. Cl.[4] ..... G03G 9/08

[52] U.S. Cl. ..... 430/110; 430/106.6; 430/115

[58] Field of Search ..... 430/110, 106.6, 528, 430/111, 115

[56] References Cited

U.S. PATENT DOCUMENTS

| | | | |
|---|---|---|---|
| 3,431,412 | 3/1969 | Okubo et al. | 430/348 |
| 3,893,935 | 7/1975 | Jadwin et al. | 252/62.1 |
| 3,944,493 | 3/1976 | Jadwin et al. | 252/62.1 |
| 3,970,571 | 7/1976 | Olson et al. | 252/62.1 |
| 4,021,358 | 5/1977 | Tomono et al. | 252/62.1 |
| 4,071,655 | 1/1978 | Brana et al. | 430/104 |

FOREIGN PATENT DOCUMENTS

| | | | |
|---|---|---|---|
| 2702526 | 7/1977 | Fed. Rep. of Germany | 430/110 |
| 1174571 | 12/1969 | United Kingdom | 430/111 |

OTHER PUBLICATIONS

Xerox copending Application U.S.S.N. 911,623, filed 5/30/78; Chin H. Lu.

*Primary Examiner*—John D. Welsh
*Attorney, Agent, or Firm*—E. O. Palazzo

[57] ABSTRACT

This invention is directed to a dry electrostatic toner composition containing a resin, a colorant or pigment, and an organic sulfate or sulfonate charge control additive of the following formula:

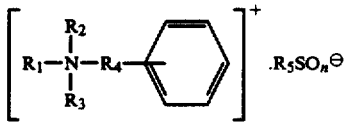

wherein $R_1$ is an alkyl radical containing from about 12 carbon atoms to about 22 carbon atoms, and preferably from about 14 carbon atoms to 18 carbon atoms, $R_2$ and $R_3$ are independently selected from alkyl groups containing from about 1 carbon atom to about 5 carbon atoms, $R_4$ is an alkylene group containing from about 1 carbon atom to about 5 carbon atoms, $R_5$ is a tolyl group or an alkyl group containing from about 1 carbon atom to about 3 carbon atoms and n is the number 3 or 4. Such toners, especially when combined with carrier materials, are useful for causing the development of images in an electrophotographic system.

47 Claims, No Drawings

QUARTERNARY AMMONIUM SULFATE OR SULFONATE CHARGE CONTROL AGENTS FOR ELECTROPHOTOGRAPHIC DEVELOPERS COMPATIBLE WITH VITON FUSER

Matter enclosed in heavy brackets [ ] appears in the original patent but forms no part of this reissue specification; matter printed in italics indicates the additions made by reissue.

BACKGROUND OF THE INVENTION

This invention is generally directed to new toner compositions, and developer materials containing such compositions, as well as the use of such compositions in electrophotographic imaging systems. More specifically, the present invention is directed to toners containing certain charge control additives, which additives impart a positive charge to the toners involved. Toner materials containing such additives are in one embodiment of the present invention useful in electrophotographic imaging systems employing a Viton fuser system, as more specifically detailed hereinafter.

The electrophotographic process and more specifically, the xerographic process is well known, as documented in several prior art references. In these processes, an electrostatic latent image is developed by applying electroscopic particles or toners to the electrostatic image to be developed, using for example cascade development as described in U.S. Pat. No. 3,618,552, magnetic brush development as described in U.S. Pat. Nos. 2,874,063 and 3,251,706, or touchdown development as described in U.S. Pat. No. 3,166,432. In some instances it may be desirable in such systems to produce a reverse copy of the original. Thus, for example, it may be desirable to produce a negative copy from a positive original or a positive copy from a negative original.

It is known in the prior art that certain charge control agents can be used for the purpose of providing a positive charge to the toner material. For example, U.S. Pat. No. 3,893,935 discloses the use of certain quaternary ammonium compounds as charge control agents for electrostatic toner compositions. According to the disclosure of this patent, certain quaternary ammonium compounds when incorporated into toner materials were found to provide a toner composition which exhibited relatively high uniform and stable net toner charge, when mixed with a suitable carrier vehicle. U.S. Pat. No. 4,079,014 contains a similar teaching with the exception that a different charge control agent is used, namely a diazo type material. Further, other charge control agents have been described in Xerox copending applications including for example alkyl pyridinium materials, reference U.S. Ser. No. 911,623, filed on June 1, 1978.

Many of the above charge control agents interact with certain fuser rolls used in electrophotographic systems such as the Viton fuser roll which causes such fusers to be adversely affected and thus cause a deterioration in the image quality. For example, the Viton fuser rolls discolor and turn black, as well as develop multiple surface cracks when certain charge control additive compounds are employed in the toner mixture.

One Viton fuser roll used in electrophotographic copying machines, particularly xerographic copying machines, is comprised of a soft roll fabricated from lead oxide and dePont Viton E-430 resin (a vinylidene fluoride, hexafluoropropylene copolymer). Approximately 15 parts of lead oxide and 100 parts of the Viton E-430 are blended together and cured on a roll at elevated temperatures. Apparently the function of the lead oxide is to generate unsaturation by dehydrofluorination for cross-linking and to provide release mechanisms for the toner. Excellent image quality has been obtained with the use of Viton fuser rolls, however, in some instances there is a toner fuser compatibility problem when charge control agents are part of the toner mixture. It appears that certain charge control additives such as quaternary ammonium compounds and alkyl pyridinium compounds react with the Viton fuser roll. For example, an alkyl pyridinium chloride, such as cetyl pyridinium chloride when part of the toner mixture appears to be catalytically decomposed by the lead oxide in the fuser roll, resulting in a highly unsaturated compound which polymerizes and condenses with the unsaturated Viton. As a result the Viton fuser turns black and develops multiple surface cracks, thereby resulting in image quality deterioration.

Accordingly there is a need for toners, and developers containing such toners, which can be used in a reversal system, and more specifically, there is a need for positively charged toner materials for use in electrophotographic systems employing Viton type fuser rolls, thus allowing the production of high quality images over a long period of time. Further there is a need for toners which will rapidly charge new uncharged toner being added to the developer package, which toners are humidity insensitive, as well as being compatible with Viton fuser rolls.

SUMMARY OF THE INVENTION

It is an object of this invention to provide a toner which overcomes the above-noted disadvantages.

It is a further object of the present invention to provide a developer which contains toner and carrier, with the toner being charged positively.

Another object of the present invention is the provision of toners for use in developer compositions, which toners contain positively charged particles having improved toner admix charging, improved humidity insensitivity, while at the same time being compatible with Viton fuser rolls.

An additional object of the present invention is the provision of toners which will develop an electrostatic image containing negative charges on the photoreceptor surface, and which will transfer effectively electrostatically from such a photoreceptor to plain bond paper without causing blurring, or adversely affecting the quality of the resulting image, particularly when such toners are used as part of the developer package employed in a xerographic copying system wherein a Viton fuser roll is present.

These and other objects of the present invention are accomplished by providing dry electrostatic toner compositions containing a resin, a colorant or pigment, and an organic sulfate or sulfonate charge control additive of the following formula:

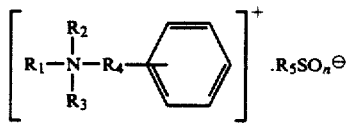

wherein $R_1$ is an alkyl radical containing from about 12 carbon atoms to about 22 carbon atoms, and preferably from about 14 carbon atoms to 18 carbon atoms, $R_2$ and $R_3$ are independently selected from alkyl groups containing from about 1 carbon atom to about 5 carbon atoms, $R_4$ is an alkylene group containing from about 1 carbon atom to about 5 carbon atoms, $R_5$ is a tolyl group or an alkyl group containing from about 1 carbon atom to about 3 carbon atoms and n is the number 3 or 4.

Illustrative examples of alkyl radicals include methyl, ethyl, propyl, butyl, pentyl, hexyl, octyl, nonyl, decyl, myristyl, cetyl, olely, pentadecyl, heptadecyl, stearyl and the like. Preferred alkyl groups for $R_1$ include myristyl, stearyl, and cetyl, while preferred alkyl groups for $R_2$, $R_3$, and $R_5$ include methyl, ethyl, and propyl, with the preferred alkylene groups for $R_4$ being methylene and ethylene. Examples of other alkylene groups include propylene, butylene, pentylene and the like.

Illustrative examples of organic sulfate or sulfonate materials useful in the present invention include stearyl dimethyl benzyl ammonium para-toluene sulfonate, stearyl dimethyl benzyl ammonium methyl sulfate, stearyl dimethyl phenethyl ammonium methyl sulfate, stearyl dimethyl phenethyl ammonium para-toluene sulfonate, cetyl diethyl benzyl ammonium methyl sulfate, myristyl dimethyl phenethyl ammonium para-toluene sulfonate, cetyl dimethyl benzyl ammonium methylsulfate and the like.

The organic sulfate or sulfonate compounds can be used in amounts that do not adversely affect the system, and results in a toner that is charged positively in comparison to the carrier. Thus, for example, the amount of organic sulfate or sulfonate compound present can range from about 0.1 percent by weight to 10 percent by weight of toner, and preferably from about 0.5 weight percent to about 5 weight percent of the total toner weight. In one preferred embodiment, the organic sulfate or sulfonate compound is present in an amount of from 0.75 weight percent to 3.0 weight percent. The organic sulfate or sulfonate material can either be blended into the system or coated on the colorant or pigment, such as carbon black, which is used as the colorant in the developing compositions. When it is employed as a coating, it is present in an amount of about 2 weight percent to about 20 weight percent, and preferably from about 5 weight percent to about 10 weight percent, based on the weight of pigment.

Numerous methods may be employed to produce the toner of the present invention, one method involving melt blending the resin and the pigment coated with the organic sulfate or sulfonate compounds, followed by mechanical attrition. Other methods include those well known in the art such as spray drying, melt dispersion, dispersion polymerization and suspension polymerization. In dispersion polymerization a solvent dispersion of a resin pigment and the organic sulfate or sulfonate compound are spray dryed under controlled conditions thereby resulting in the desired product. A toner prepared in this manner results in a positively charged toner in relationship to the carrier materials used, and these materials exhibit the improved properties as mentioned hereinbefore.

While any suitable resin may be employed in the system of the present invention, typical of such resins are polyamides, epoxies, polyurethanes, vinyl resins, and polyesters, especially those prepared from dicarboxylic acids and diols comprising diphenols. Any suitable vinyl resin may be employed in the toners of the present system, including homopolymers or copolymers of two or more vinyl monomers. Typical of such vinyl monomeric units include: styrene, p-chlorostyrene, vinyl naphthalene, ethylenically unsaturated mono-olefins such as ethylene, propylene, butylene, isobutylene and the like; vinyl halides such as vinyl chloride, vinyl bromide, vinyl fluoride, vinyl esters such as vinyl acetate, vinyl propionate, vinyl benzoate, vinyl butyrate and the like; esters of aliphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl indole, N-vinyl pyrrolidene and the like; and mixtures thereof.

Generally toner resins containing a relatively high percentage of styrene are preferred. The styrene resin employed may be a homopolymer of styrene or styrene homologs of copolymers of styrene with other monomeric groups. Any of the above typical monomeric units may be copolymerized with styrene by addition polymerization. Styrene resins may also be formed by the polymerization of mixtures of two or more unsaturated monomeric materials with a styrene monomer. The addition polymerization technique employed embraces known polymerization techniques such as free radical, anionic, and cationic polymerization processes. Any of these vinyl resins may be blended with one or more resins if desired, preferably other vinyl resins, which insure good triboelectric properties and uniform resistance against physical degradation. However, non-vinyl type thermoplastic resins may also be employed including resin modified phenolformaldehyde resins, oil modified epoxy resins, polyurethane resins, cellulosic resins, polyether resins, and mixtures thereof.

Also esterification products of a dicarboxylic acid, and a diol comprising a diphenol may be used as a preferred resin material for the toner composition of the present invention. These materials are illustrated in U.S. Pat. No. 3,655,374 totally incorporated herein by reference, the diphenol reactant being of the formula as shown in column 4, beginning at line 5 of this patent, and the dicarboxylic acid being of the formula as shown in column 6 of the above patent. The resin is present in an amount so that the total of all toner ingredients is equal to about 100%, thus when 5% by weight of the sulfonate compound is present, and 10% by weight of a pigment or colorant, such as carbon black is present, about 85% by weight of resin material is present.

Optimum electrophotographic resins are achieved with styrene butylmethacrylate copolymers, styrene vinyl toluene copolymers, styrene acrylate copolymers, polyester resins, predominantly styrene or polystyrene base resins as generally described in U.S. Pat. No. Re. 25,136 to Carlson, polystyrene blends as described in U.S. Pat. No. 2,788,288 to Rheinfrank and Jones, and styrene-butadiene resins.

Any suitable pigment or dye may be employed as the colorant for the toner particles, such materials being well known and including for example, carbon black, magnetite, iron oxides, nigrosine dye, chrome yellow, ultramarine blue, DuPont oil red, methylene blue chloride, phthalocyanine blue and mixtures thereof. The pigment or dye should be present in the toner in sufficient quantity to render it highly colored, so that it will form a clearly visible image on the recording member. For example, where conventional xerographic copies of documents are desired, the toner may comprise a black pigment, such as carbon black, or a black dye such as Amaplast black dye available from the National Aniline Products, Inc. Preferably, the pigment is employed in amounts of from about 3% to about 50% by weight based on the total weight of toner, however, if the pigment employed is a dye, substantially smaller quantities, for example less than 10 percent by weight, may be used.

Any suitable carrier material can be employed in formulating the developing compositions of the present invention, (toner plus carrier), as long as such carrier particles are capable of triboelectrically obtaining a charge of opposite polarity to that of the toner particles. In the present invention in one embodiment that would be a negative polarity, so that the toner particles will adhere to and surround the carrier particles. Thus, the carriers are be selected so that the toner particles acquire a charge of a positive polarity, and include materials such as sodium chloride, ammonium chloride, ammonium potassium chloride, Rochelle Salt, sodium nitrate, aluminum nitrate, potassium chlorate, granular zircon, granular silicon, methylmethacrylate, glass, steel, nickel, iron ferrites, silicon dioxide and the like, with metallic carriers especially magnetic carriers being preferred. The carriers can be used with or without a coating. The coatings generally contain polyvinyl fluoride resins, but other resins especially those which charge negatively, such as polystyrene, halogen containing ethylenes and the like can be used. Many of the typical carriers that can be used are described in U.S. Pat. Nos. 2,618,441; 2,638,522; 3,618,522; 3,591,503; 3,533,835; and 3,526,533. Also nickel berry carriers as described in U.S. Pat. Nos. 3,847,604 and 3,767,598 can be employed, these carriers being modular carrier beads of nickel characterized by surface of reoccurring recesses and protrusions providing particles with a relatively large external area. The diameter of the coated carrier particle is from about 50 to about 1000 microns, thus allowing the carrier to possess sufficient density and inertia to avoid adherence to the electrostatic images during the development process.

The carrier may be employed with the toner composition in any suitable combination, however, best results are obtained when about 1 part of toner is used, to about 10 to about 200 parts by weight of carrier.

Toner compositions of the present invention may be used to develop electrostatic latent images on most suitable electrostatic surface capables of retaining charge, including conventional photoconductors, however, the toners of the present invention are best utilized in systems wherein a negative charge resides on the photoreceptor, and this usually occurs with organic photoreceptors. Illustrative examples of such photoreceptors are polyvinyl carbazole, 4-dimethylaminobenzylidene, benzyhydrazide; 2-benzylidene-aminocarbazole, 4-diemethylaminobenzylidene, benzhydrazide; 2-benzylidene-aminocarbazole, polyvinylcarbazole; (2-nitro-benzylidene)p-bromoaniline; 2,4-diphenylquinazoline; 1,2,4-triazine; 1,5-diphenyl-3methyl pyrazoline 2-(4'-dimethyl-amino phenyl)benzoxazole; 3-amino-carbazole; polyvinylcarbazole-trinitrofluorenone charge transfer complex; phthalocyanines and mixtures thereof.

The following examples are being supplied to further define the species of the present invention, it being noted that these examples are intended to illustrate and not limit the scope of the present invention. Parts and percentages are by weight unless otherwise indicated.

EXAMPLE I

The charge control additive stearyl dimethyl benzyl ammonium para-toluene sulfonate of the following formula was synthesized, by Hexcel Company, Lodi, New Jersey.

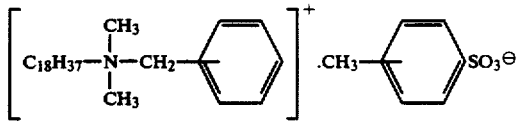

The isolated compound had a melting point of 169° to 173° C. and was nonhygdroscopic. Moisture absorption measurements were accomplished on this material with the following results:

| Relative Humidity Percentage | Moisture Content Percentage |
|---|---|
| 20 | 0 |
| 51 | 0 |
| 81 | 0.04 |

The stearyl dimethyl benzyl ammonium para-toluene sulfonate was placed on a part of a Viton fuser roll and heated to 205° C. for 30 minutes. The Viton fuser roll was then washed with alcohol to remove the compound and examined for discoloration and cracks. The Viton fuser roll did not discolor, nor turn black in color, nor were any surface cracks observed, indicating that this compound was compatible with the Viton fuser.

A toner comprising 2 percent of stearyl dimethyl benzyl ammonium para-toluene sulfonate, 6 percent of Regal 330, a carbon black, commercially available from Cabot Corporation, and 92 percent of a styrene/n-butylmethacrylate copolymer resin, 65/35, (65% by weight styrene, 35% by weight of n-butylmethacrylate), was prepared by melt blending followed by mechanical attrition. The resulting toner was classified in order to remove particles smaller than 5 microns in diameter.

The triboelectric charge on this toner was measured against a Hoeganese steel carrier coated with 0.15 percent Kynar 301, a vinylidene fluoride resin commercially available from Pennwalt Company, at 3 percent toner concentration with the following results:

| Time | Toner Tribo uc/g (microcoulombs per gram) |
|---|---|
| 10 min. | +59 |
| 1 hour | +49 |
| 4 hours | +36 |
| 24 hours | +19 |

Charge distribution measurements showed that the above developer had a narrow charge distribution, with a minimum insignificant number, less than 1percent of toner particles, containing a low charge, less than +15 uc/g. and minimum wrong sign negatively charged toner particles. Admix experiment showed that the toner had fast charging properties when fresh uncharged toner was added to the developer, that is, the fresh toner became positively charged in less than 1 minute.

The above developer was also exposed to an atmosphere at 10 percent, 42 percent, and 80 percent relative humidity for 48 hours, and the triboelectric properties measured.

The triboelectric properties after 4 hours of roll milling varied only slightly at high and low relative humidity indicating the humidity insensitivity of this developer. The measurements were as follows:

| Relative Humidity Percentage | Toner Tribo At 4 Hours uc/g (microcoulombs per gram) |
|---|---|
| 10 | +39 |
| 42 | +36 |
| 80 | +34 |

The above developer was used in a xerographic imaging device, containing an organic polyvinyl carbazole photoreceptor, charged negatively, which device also contained a Viton fuser roll. Not only were excellent high quality images obtained, but no damage occurred to the Viton fuser roll after 50,000 imaging cycles.

EXAMPLE II

A toner composition was prepared in accordance with Example I, which toner composition contained 1 percent by weight of stearyl dimethylbenzyl ammonium para-toluene sulfonate, 6 percent of Regal 330 carbon black, and 93 percent of a styrene/n-butyl methacrylate copolymer resin, 58 weight percent styrene, 42 weight percent n-butylmethacrylate. The triboelectric properties of this toner against the carrier of Example I, at 3 percent concentration of toner were as follows:

| Time | Toner Tribo uc/g (microcoulombs per gram) |
|---|---|
| 10 min | +54 |
| 1 hour | +43 |
| 4 hours | +32 |
| 24 hours | +20 |

The above developer was exposed to an atmosphere at 10 percent, 45 percent, and 80 percent relative humidity for 48 hours. The triboelectric properties after 4 hours of roll milling varied only slightly at high and low relative humidity, indicating the humidity insensitivity of this developer. The toner tribos at these relative humidities were as follows:

| Relative Humidity % | Toner tribo at 4 Hours uc/g (Microcoulombs per gram) |
|---|---|
| 10 | +31 |
| 45 | +32 |
| 80 | +28 |

EXAMPLE III

A toner comprising 2 percent of stearyl dimethyl benzyl ammonium para-toluene sulfonate, 6 percent Regal 330 carbon black, and 92 percent of a styrene/-butadiene copolymer resin, (91/9), was prepared by melt blending followed by mechanical attrition. The resulting toner was classified to remove particles smaller than 5 microns in diameter. The classified toner was blended with the carrier described in Example I at 2.7 percent toner concentration. The triboelectric charge of the toner was measured with the following results

| Time | Toner Tribo, uc/g (Microcoulombs per gram) |
|---|---|
| 10 mins. | +83 |
| 1 hr. | +53 |
| 3 hr. | +43 |
| 5 hr. | +35 |
| 24 hr. | +15 |

EXAMPLE IV

The charge control additive stearyl dimethyl phenethyl ammonium para-toluene sulfonate of the following formula was synthesized, by Hexcel Company, Lodi, N.J.

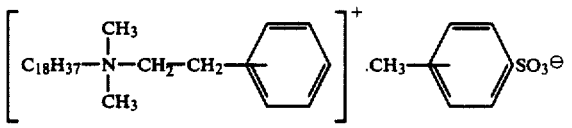

The compound had a melting point of about 75° C. and was non-hygroscopic. The moisture absorption of this material was measured with the following results

| Relative Humidity Percentage | Moisture Content Percentage |
|---|---|
| 20 | 0.02 |
| 51 | 0.02 |
| 81 | 0.05 |

The stearyl dimethyl phenethyl ammonium para-toluene sulfonate was placed on a part of a Viton fuser roll and heated to 205° C. for 30 minutes. The Viton fuser roll was then washed with alcohol to remove the compound and examined for discoloration and cracks. The Viton fuser roll did not discolor nor turn black in color, nor were any surface cracks observed, indicating that stearyl dimethyl phenethyl ammonium para-toluene sulfonate was compatible with the Viton fuser.

A toner comprising 2 percent stearyl dimethyl phenethyl ammonium para-toluene sulfonate, 6 percent Regal 330 carbon black, and 92 percent styrene/butadiene copolymer resin, 91/9, was prepared by melt blending and followed by mechanical attrition. The resulting toner was classified to remove particles smaller than 5 microns in diameter. The classified toner was blended with the carrier described in Example I at 2.7 percent toner concentration. The triboelectric charge of the toner was measured with the following results

| Time | Toner Tribo, uc/g (Microcoulombs per gram) |
|---|---|
| 10 mins | +35 |
| 1 hr. | +42 |
| 3 hr. | +32 |
| 5 hr. | +20 |

-continued

| Time | Toner Tribo, uc/g (Microcoulombs per gram) |
|---|---|
| 24 hr. | +6 |

Charge distribution measurements showed that the above developer had a narrow charge distribution, with a minimum insignificant number, less than 1 percent of toner particles, containing a low charge less than +15 uc/g, and minimum wrong sign negatively charged toner particles. Admix experiment showed that the toner had fast charging properties when fresh uncharged toner was added to the developer, that is, the fresh toner became positively charged in less than 1 minute.

The above developer was tested in a device using the organic photoreceptor of Example I which was negatively charged and a Viton fuser. Good quality prints with high solid area density and low background density were obtained. The Viton fuser was not noticeably affected.

EXAMPLE V

A toner comprising 2 percent stearyl dimethyl phenethyl ammonium para-toluene sulfonate, 20 percent Mapico Black magnetite pigment commercially available from Cities Service Co., and 78 percent styrene/n-butylmethacrylate 58/42, 58 weight percent styrene, 42 weight percent n-butylmethacrylate, copolymer resin was fabricated by melt blending followed by mechanical attrition. The toner was further classified to remove particles smaller than 5 microns. The tribos against the carrier described in Example I at 3 percent toner concentration are given below

| Time | Toner Tribo, uc/g (Microcoulombs per gram) |
|---|---|
| 10 min. | +31 |
| 1 hr. | +24 |
| 4 hr. | +21 |
| 24 hr. | +15 |

Charge distribution measurements showed that the above developer had a narrow charge distribution, with a minimum insignificant number, less than 1 percent of toner particles containing a low charge less than +15 uc/g, and minimum wrong sign negatively charged toner particles. Admix experiment showed that the toner had fast charging properties when fresh uncharged toner was added to the developer, that is, the fresh toner became positively charged in less than 1 minute.

The toners and developers of the present invention are useful for causing the development of images in electrophotographic systems as indicated herein. In one imaging method there is formed a negative electrostatic latent image on the photoreceptor surface, followed by containing the image with dry positively charged developing compositions of the present invention. Subsequently, the developed latent image can be transferred to a substrate, such as paper, and optionally permanently fixed thereto by heat.

When the developer compositions of Examples II and III, were tested in the xerographic imaging device of Example I, excellent high quality developed images were obtained, and no damage occurred to the Viton fuser roll after 50,000 imaging cycles.

Other modifications of the present invention may occur to those skilled in the art upon a reading of the present disclosure. These are intended to be included within the scope of the present invention.

What is claimed is:

1. A dry electrostatic toner composition comprised of toner particles containing resin particles and pigment particles, and *dispersed therein as a charge enhancing additive* from about 0.1 to about 10 percent based on the weight of the toner particles of an organic [sulfate or] sulfonate composition of the following formula:

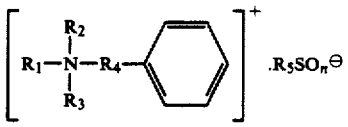

wherein $R_1$ is an alkyl radical containing from about 12 carbon atoms to about 22 carbon atoms, $R_2$ and $R_3$ are independently selected from alkyl groups containing from about 1 carbon atom to about 5 carbon atoms, $R_4$ is an alkylene group containing from about 1 carbon atom to about 5 carbon atoms, $R_5$ is a tolyl group [or an alkyl group containing from about 1 carbon atom to about 3 carbon atoms] and n is the number 3 [or 4].

2. A toner composition in accordance with claim 1 wherein $R_1$ is an alkyl group containing from about 14 to about 18 carbon atoms, $R_2$, $R_3$, are alkyl groups having from 1 to about 5 carbon atoms, $R_4$ is an alkylene group, $R_5$ is a tolyl radical, and n is the number 3.

3. A toner composition in accordance with claim 1 wherein $R_1$ is stearyl, $R_2$, $R_3$, are methyl, *and* $R_4$ is methylene or ethylene [, $R_5$ is methyl, and n is the number 4].

4. A toner composition in accordance with claim 1 wherein the organic sulfonate compound is stearyl dimethyl benzyl ammonium para-toluene sulfonate.

[5. A toner composition in accordance with claim 1 wherein the organic sulfate compound is stearyl dimethyl benzyl ammonium methyl sulfate.]

[6. A toner composition in accordance with claim 1 wherein the organic sulfate compound is stearyl dimethyl phenethyl ammonium methyl sulfate.]

7. A toner composition in accordance with claim 1 wherein the organic sulfonate compound is stearyl dimethyl phenethyl ammonium paratoluene sulfonate.

8. A toner composition in accordance with claim 1 wherein the organic sulfonate material is cetyl diethyl benzyl ammonium para-toluene sulfonate.

9. A method of imaging comprising forming a negative electrostatic latent image on a photoreceptor surface, contacting the resulting image with a developer composition comprised of positively charged toner particles and carrier particles, the toner particles being comprised of resin particles, pigment particles, and *dispersed therein as a charge enhancing additive* from about 0.1 to about 10 weight percent based on the weight of the toner particles of an organic [sulfate or] sulfonate composition of the following formula:

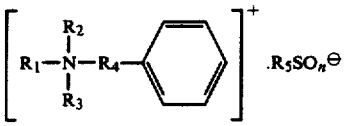

followed by subsequently transferring the developed latent image to a substrate, and permanently affixing the image thereto, wherein $R_1$ is [analkyl] *an alkyl* radical containing from about 12 carbon atoms to about 22 carbon atoms, $R_2$ and $R_3$ are independently selected from alkyl groups containing from about 1 carbon atom to about 5 carbon atoms, $R_4$ is an alkylene group containing from about 1 carbon atom to about 5 carbon atoms, $R_5$ is tolyl group [or an alkyl group containing from about 1 carbon atom to about 3 carbon atoms] and n is the number 3 [or 4].

10. A method of imaging in accordance with claim 9 wherein $R_1$ is an alkyl group containing from about 14 to about 18 carbon atoms, $R_2$, $R_3$ are alkyl groups having from about 1 carbon atoms to about 5 carbon atoms, $R_4$ is an alkylene group containing 1 to 3 carbon atoms, $R_5$ is a tolyl and n is the number 3.

11. A method of imaging in accordance with claim 9 wherein $R_1$ is stearyl, $R_2$, $R_3$, and $R_5$ are methyl, *and* $R_4$ is methylene or ethylene [and n is the number 4].

[12. A method of imaging in accordance with claim 9 wherein the charge control additive is stearyl dimethyl benzyl ammonium methyl sulfate.]

[13. A method of imaging in accordance with claim 9 wherein the charge control additive is stearyl dimethyl phenethyl ammonium methyl sulfate.]

14. A method of imaging in accordance with claim 9 wherein the charge control agent is stearyl dimethyl phenethyl ammonium para-toluene sulfonate.

15. A method of imaging in accordance with claim 9 wherein the charge control agent is cetyl diethyl benzyl ammonium para-toluene sulfonate.

16. A method of imaging in accordance with claim 9 wherein there is used as the fusing mechanism a soft roll fuser wherein contamination and decomposition of the materials on the fuser roll are not adversely affected.

17. A dry electrostatic developer composition comprised of toner particles and carrier particles, the toner particles being comprised of resin particles, and pigment particles, said developer composition further including *dispersed in the toner particles as a charge enhancing additive* from about 0.1 to about 10 percent based on the weight of the toner particles of an organic [sulfate or] sulfonate composition of the following formula:

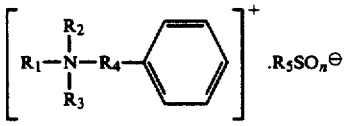

wherein $R_1$ is an alkyl radical containing from about 12 carbon atoms to about 22 carbon atoms, $R_2$ and $R_3$ are independently selected from alkyl radicals containing from about 1 carbon atom to about 5 carbon atoms, $R_4$ is an alkylene group containing from about 1 carbon atom to about 5 carbon atoms, $R_5$ is a tolyl group [or an alkyl group containing from about 1 carbon atom to about 3 carbon atoms], and n is the number 3 [or 4].

18. A developer composition in accordance with claim 17 wherein the carrier is comprised of a steel core coated with a perfluoralkoxy fluoropolymer resin, or with a vinylidene fluoride resin.

19. A developer composition in accordance with claim 17 wherein from about 1 part of toner to 200 parts of carrier particles are employed.

20. A developer composition in accordance with claim 17 wherein $R_1$ is an alkyl group containing from about 14 carbon atoms to about 18 carbon atoms, $R_3$ are alkyl radicals having from 1 to about 5 carbon atoms, $R_4$ is an alkylene group, $R_5$ is a tolyl radical, and n is the number 3.

21. A developer composition in accordance with claim 17 wherein the organic sulfonate compound is strearyl dimethyl benzyl ammonium paratoluene sulfonate.

[22. A developer composition in accordance with claim 17 wherein the organic sulfate compound is stearyl dimethyl benzyl ammonium methyl sulfate.]

[23. A developer composition in accordance with claim 17 wherein the organic sulfate compound is stearyl dimethyl phenthyl ammonium methyl sulfate.]

24. A developer composition in accordance with claim 17 wherein the organic sulfonate compound is stearyl dimethyl phenethyl ammonium para-toluene sulfonate.

25. A method of imaging in accordance with claim 9 wherein the image is permanently affixed to a substrate utilizing a fusing mechanism comprised of a soft roll fuser.

26. A method of imaging in accordance with claim 25 wherein the soft roll fuser is comprised of lead oxide coated with a vinylidene fluoride hexafluoropropylene copolymer resin.

27. A developer composition in accordance with claims 1 or 17 wherein the resin is a styrene acrylate copolymer, or a styrene butadiene copolymer.

28. A developer composition in accordance with claim 27 wherein the styrene acrylate copolymer is a styrene butylmethacrylate copolymer, and the styrene butadiene copolymer comprises from about 80 percent to about 90 percent of styrene, and from about 10 percent to about 20 percent of butadiene.

29. A developer composition in accordance with claim 28 wherein the styrene butylmethacrylate copolymer is a styrene n-butylmethacrylate copolymer comprised of from about 55 weight percent styrene to about 70 weight percent styrene, and from about 45 weight percent n-butylmethacrylate to about 30 weight percent of n-butylmethacrylate.

30. A developer composition in accordance with claim 29 wherein the resin is comprised of a styrene n-butylmethacrylate copolymer resin containing 65 percent by weight of styrene, and 35 percent by weight of n-butylmethacrylate.

31. A developer composition in accordance with claim 30 wherein the styrene n-butylmethacrylate copolymer resin is comprised of 58 percent by weight of styrene, and 42 percent by weight of n-butylmethacrylate.

32. A developer composition in accordance with claims 1 or 17 wherein the pigment is carbon black.

*33. A two-component electrophotographic developer comprising magnetic carrier particles and a dry particulate electrophotographic toner comprising a major amount of binder polymer and dispersed therein as a charge control agent in an amount of from 0.1 to 10 weight percent of the*

*particulate toner, a quaternary ammonium salt of the formula:*

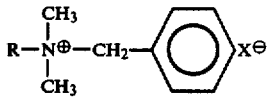

*wherein R is an alkyl group of 12 to 22 carbon atoms and X is the anion $R_5SO_n$ wherein $R_5$ is a tolyl group, and n is the number 3.*

*34. A developer according to claim 33 wherein the binder polymer also has a colorant dispersed therein and R is a straight chain alkyl of 14 to 18 carbon atoms and X is a 1 to about 3 carbon atom alkyl sulfonate ion, or a tolyl sulfonate ion.*

*35. A developer according to claim 34 wherein R is octadecyl.*

*36. A developer according to claim 34 wherein the binder polymer is a styrene acrylic copolymer.*

*37. A developer according to claim 36 wherein the binder polymer is cross-linked, styrene-butylacrylate copolymer and the colorant is a carbon black.*

*38. A developer according to claim 37 wherein the toner contains 0.5 to 5 parts by weight of said quaternary ammonium salt and about 6 parts by weight of carbon black per hundred parts of polymer.*

*39. An electrophotographic developer according to claim 38 comprising a mixture of ferromagnetic carrier particles coated with a fluorocarbon polymer and said particulate toner.*

*40. A two-component electrophotographic developer comprising magnetic carrier particles and a dry particulate electrophotographic toner comprising a major amount of binder polymer and dispersed therein as a charge control agent in an amount of from 0.1 to 10 weight percent of the particulate toner, a quaternary ammonium salt of the formula:*

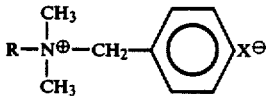

*wherein R is an alkyl group of 12 to 24 carbon atoms, and X is a 1 to about 3 carbon alkyl sulfonate ion or a tolyl sulfonate ion.*

*41. A developer according to claim 40, wherein R is an alkyl group of 14 to 18 carbon atoms.*

*42. A developer composition in accordance with claim 40 wherein the charge control agent is present in an amount of 0.1 to 3 weight percent.*

*43. A developer composition in accordance with claim 40 wherein the binder polymer has a colorant dispersed therein.*

*44. A dry electrostatic toner composition comprised of toner particles containing resin particles and pigment particles, and dispersed in the toner paticles from about 0.1 to about 10 percent based on the weight of the toner particles a charge enhancing additive selected from the group consisting of stearyl dimethyl benzyl ammonium paratoluene sulfonate and stearyl dimethyl phenethyl ammonium paratoluene sulfonate.*

*45. A toner composition in accordance with claim 44 wherein the pigment particles are carbon black.*

*46. A toner composition in accordance with claim 44 wherein the resin particles are selected from the group consisting of styrene acrylate copolymers and styrene butadiene copolymers.*

*47. A developer composition comprised of the toner composition of claim 44, and carrier particles.*

*48. A developer composition in accordance with claim 47 wherein the carrier is comprised of a steel core.*

*49. A developer composition in accordance with claim 47 wherein the developer contains thereover a polymeric coating.*

*50. A developer composition in accordance with claim 49 wherein the polymeric coating is a perfluoroalkoxy fluoropolymer resin or a vinylidene fluoride resin.*

*51. A dry electrostatic toner composition comprised of toner particles containing resin particles and pigment particles, and dispersed in the toner particles as a charge enhancing additive from about 0.1 to about 10 percent based on the weight of the toner particles stearyl dimethyl phenethyl ammonium methyl sulfate.*

*52. A toner composition in accordance with claim 51 wherein the pigment particles are carbon black.*

*53. A developer composition comprised of the toner composition of claim 51, and carrier particles.*

* * * * *